United States Patent
Musoll

(10) Patent No.: US 7,415,531 B2
(45) Date of Patent: Aug. 19, 2008

(54) METHOD AND APPARATUS FOR PREDICTING CHARACTERISTICS OF INCOMING DATA PACKETS TO ENABLE SPECULATIVE PROCESSING TO REDUCE PROCESSOR LATENCY

(75) Inventor: Enrique Musoll, San Jose, CA (US)

(73) Assignee: Mips Technologies, Inc., Mountain View, CA (US)

( * ) Notice: Subject to any disclaimer, the term of this patent is extended or adjusted under 35 U.S.C. 154(b) by 588 days.

(21) Appl. No.: 09/935,446

(22) Filed: Aug. 22, 2001

(65) Prior Publication Data

US 2003/0041168 A1  Feb. 27, 2003

(51) Int. Cl.
*G06F 15/173* (2006.01)
(52) U.S. Cl. ............... 709/238; 709/239; 709/240
(58) Field of Classification Search ............. 709/238; 370/94.1; 364/900
See application file for complete search history.

(56) References Cited

U.S. PATENT DOCUMENTS

| | | | | |
|---|---|---|---|---|
| 5,056,058 A * | 10/1991 | Hirata et al. | ........... | 709/230 |
| 5,260,942 A * | 11/1993 | Auerbach et al. | ........... | 370/474 |
| 5,557,608 A * | 9/1996 | Calvignac et al. | ........... | 370/389 |
| 5,857,201 A * | 1/1999 | Wright et al. | ........... | 707/104.1 |
| 6,243,610 B1 * | 6/2001 | Iino et al. | ........... | 700/1 |
| 6,359,883 B1 * | 3/2002 | Lechleider | ........... | 370/389 |
| 6,430,156 B1 * | 8/2002 | Park et al. | ........... | 370/232 |
| 6,622,173 B1 * | 9/2003 | Luke | ........... | 709/237 |

FOREIGN PATENT DOCUMENTS

WO  WO0111834 A1 *  2/2001

OTHER PUBLICATIONS

Krishnamurthy, Balachander and Rexford, Jennifer, "En Passant: Predicting HTTP/1.1 Traffic," 1999, IEEE, vol. 3, pp. 1768-1773.*
Kim, Tae-eun et al., "Improving Congestion Control Performance Through Loss Differentiation," Oct. 1999, IEEE, pp. 412-418.*
Matic, Victor et al. "Predictive Playout Delay Adaptation for Voice over Internet," 2000, IEEE, pp. 348-351.*
Yuan, Chin and Silvester, John A. "Queueing Analysis of Delay Constrained Voice Traffic in a Packet Switching System," 1989, IEEE, vol. 7, No. 5, pp. 729-738.*
Enrique Musoll Prediction of Packet Flow, Packet Header and Packet Payload Jun. 14, 2001, Disclosure Document #495342, USPTO.

* cited by examiner

*Primary Examiner*—Jason Cardone
*Assistant Examiner*—Azizul Choudhury
(74) *Attorney, Agent, or Firm*—Sterne Kessler Goldstein Fox PLLC

(57) ABSTRACT

A system for processing data packets in a data packet network has at least one input port for receiving data packets, at least one output port for sending out data packets, a processor for processing packet data, and a packet predictor for predicting a future packet based on a received packet, such that at least some processing for the predicted packet may be accomplished before the predicted packet actually arrives at the system. The system is used in preferred embodiments in Internet routers.

22 Claims, 5 Drawing Sheets

METHOD AND APPARATUS FOR PREDICTING CHARACTERISTICS OF INCOMING DATA PACKETS TO ENABLE SPECULATIVE PROCESSING TO REDUCE PROCESSOR LATENCY

FIELD OF THE INVENTION

The present invention is in the field of data packet processing and pertains particularly to methods and apparatus for predicting characteristics of packets arriving at a processor for processing for the purpose of reducing overall latency related to packet processing.

BACKGROUND OF THE INVENTION

In data packet networks, of which the well-known Internet is a prime example, information is prepared and sent in the form of separate data packets over a data packet network from source to destination. Such a network comprises an elaborate interconnection of nodes, and data packets may take various paths from source to destination, accomplishing a number of separate hops along a particular network path. At each computerized node, packets are processed and forwarded on to a next node or to a final destination.

Each node that is a router in a data packet network comprises processors that receive incoming data packets and processes them according to forwarding information before sending them on. In current art, as one might expect, processors operate only on received data packets.

It has occurred to the inventor that if certain characteristics of soon-to-arrive data packets can be predicted before these packets actually arrive to a packet processor, then latency in normal packet processing may be reduced. Reduction could be in proportion to successful prediction of packet characteristics.

What is clearly needed is a method and apparatus for enabling a processor to predict certain characteristics of incoming data packets before they actually arrive for processing. A system such as this would reduce overall latency in the art of packet processing.

SUMMARY OF THE INVENTION

In a preferred embodiment of the present invention a system for processing data packets in a data packet network is provided, comprising at least one input port for receiving data packets, at least one output port for sending out data packets, a processor for processing packet data, and a packet predictor for predicting a future packet based on a received packet, such that at least some processing for the predicted packet may be accomplished before the predicted packet actually arrives at the system.

In some embodiments the data packet network is the Internet network. Also in some embodiments the packet predictor mechanism utilizes a history record periodically updated by the system, to generate predicted data. The history record may comprise characteristics of recently received data packets, and may further comprise results of past predictions. In some embodiments packet prediction comprises predicting specific characteristics, comprising one or more of packet type, packet flow identification, sender information, destination information, and packet size.

The system in embodiments of the invention may be implemented in data routers and data servers.

In another aspect of the invention a packet predictor for enhancing a data packet processor is provided, comprising an input for receiving information about a first packet received for processing, a predictor for predicting characteristics of a packet to arrive at a later time, based upon the information received about the first packet, and an output for providing the predicted characteristics to the processor for processing ahead of arrival of a real packet fulfilling the prediction.

In some embodiments the data packet processor comprises a data router operating on the Internet network. Further the packet predictor may comprise a history record consulted each time a prediction is made. The history record may comprise history of real packets received and processed. Further the history may comprise history of predictions and result of the predictions. This history record may be stored in a memory accessible to the mechanism.

In some preferred embodiments packet prediction comprises predicting specific characteristics, comprising one or more of packet type, packet flow identification, sender information, destination information, and packet size, and the predictor has application in data servers as well as routers.

In yet another aspect of the invention a method for reducing latency in packet processing for a packet processor, comprising the steps of (a) speculatively predicting characteristics of packets yet to arrive for processing, based on packets actually received for processing; and (b) accomplishing speculative processing on the predicted characteristics. This packet processor may be coupled with a data packet network, which may be the Internet network.

In some preferred embodiments of the method there is a step for maintaining a history of either or both of packets actually received and results of prior predictions. The history for received packets may comprise one or more of packet type, packet flow identification, sender information, destination information, and packet size.

In some cases, in step (b) the speculative processing is abandoned if it is determined not to agree with the real data once it arrives. Also in some cases speculative processing is accomplished only on selected predicted characteristics of the predicted data packet. If some of the results from processing the predicted characteristics are wrong they may be abandoned, and results which are correct may be retained, to reduce processing for an arriving packet based on the prediction.

In embodiments of the present invention described in enabling detail below, for the first time it becomes possible to enhance the function of data packet routers by anticipating characteristics of packets yet to arrive, and speculatively accomplishing some or all of the processing requirements for an anticipated packet before the packet actually arrives to be processed.

BRIEF DESCRIPTION OF THE DRAWING FIGURES

DESCRIPTION OF THE PREFERRED EMBODIMENTS

As described in the background section of this specification, current art packet processors, operating typically in data routers, operate only on packets received to be routed. The inventor, according to an embodiment of the present invention, provides an apparatus and method that enables a processor to predict characteristics of a next incoming data packet and initiate speculative processing before the actual next packet arrives for processing. The method and apparatus of the present invention is described in enabling detail below.

Figure 1:
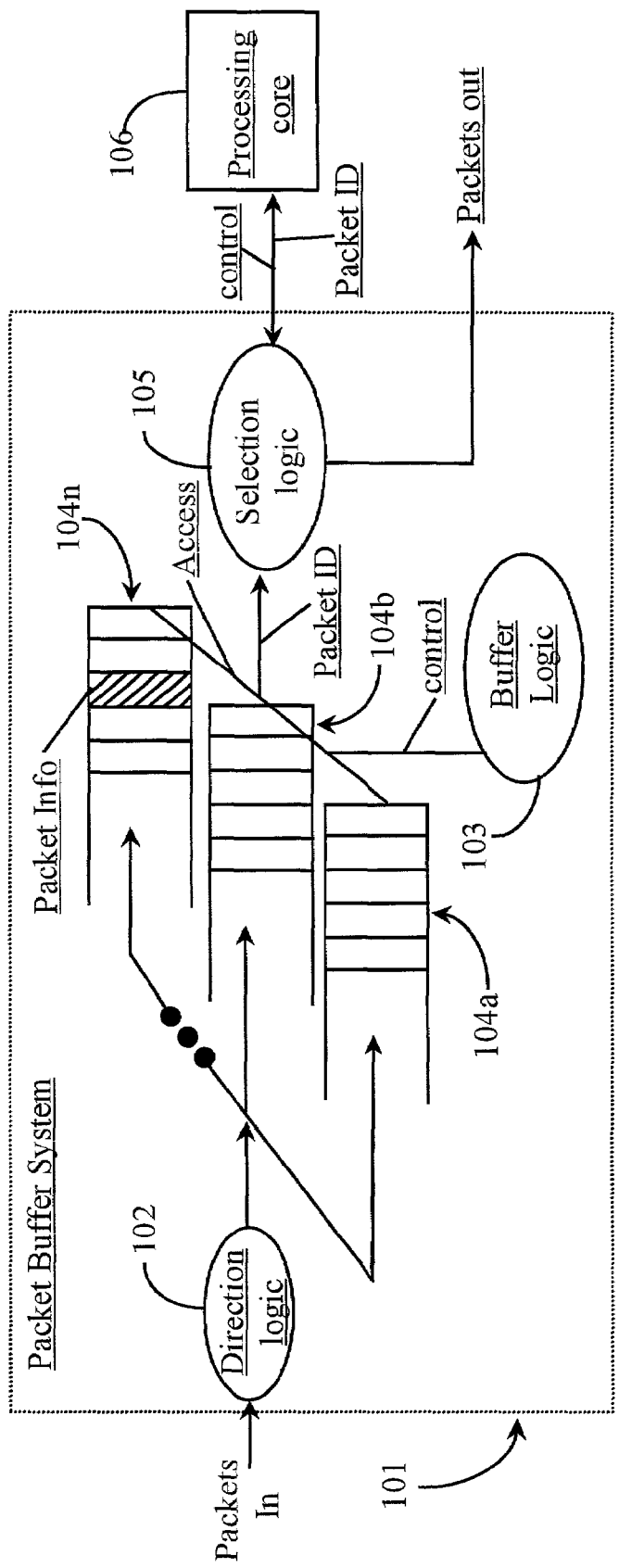
FIG. 1 is block-diagram illustrating components of a typical network processor according to prior-art.

FIG. 1 is block-diagram illustrating components of a typical network processing system according to prior-art. A packet buffer or queuing system 101 is illustrated in this example of prior art as a typical system present in data packet processors. Packet buffering system 101 comprises a direction logic block 102 adapted for receiving data packets at ingress and determining which of a plurality of data queues will be selected for holding the packet data prior to processing. In this example, there are a plurality of logically-illustrated queues 104a, 104b to 104n. It will be appreciated by one with skill in the art of data processors that there typically may be more than three queues associated with a data packet processor used for data routing on a data network.

In this example, an incoming data packet labeled Packet Info has been entered in queue 104n as indicated by cross-hatching. The data actually stored in such a queue can include simply packet identifiers and a packet header to be processed, or a complete and full data packet. This option is largely design dependant. The set of queues 104a-n has an associated buffer control logic 103 that is connected by control path to a common access path or line shared by each queue. The method of control and communication between buffer logic 103 and queue set 104a-n is only logically represented in this example. Actual physical links and structures may vary according to design. It will be appreciated by the skilled artisan that multiple ingress ports may share one set of data queues 104a-104n and that it is assumed that data packets are serially enqueued and dequeued.

Selection logic 105 is illustrated within packet buffer system 101 and is adapted to manage how processed packets are selected to be sent out of queue to egress of the processing system after processing is complete. Selection logic 105 is illustrated as connected by control path to a common access line shared by all of the queues in set 104a-n as was described above with reference to direction logic 103. A processing core 106 is illustrated in this embodiment and is adapted to process data packet information while data packets are in the system. Processing core 106 is logically connected through selection logic 105 to queue set 104a-n by a control line.

In typical prior-art processing, packets arrive through ingress of the system as illustrated herein by the label Packets In, and are buffered in any one of queues comprising set 104a-n according to direction logic 102. At least a packet identifier including a queue address location identifier labeled herein simply Packet ID is made available to processing core 106. Core 106 processes the packet information according to applicable software. It is noted in this prior-art example that processing by core 106 cannot begin until an actual data packets or sufficient information of one is enqueued in one of queues 104a-n and is identified and registered within the system.

It is known that data traffic over a data-packet-network such as the Internet network typically arrives at processors in a series of data bursts. This means that the processing workload over time of core 106 will experience peaks, valleys, and perhaps periods of idleness. These periods of low workload and idle times are unavoidable in the current art. The goal of the present invention is to utilize low workload and idle times for speculative data processing on future data packets yet to arrive.

Figure 2:
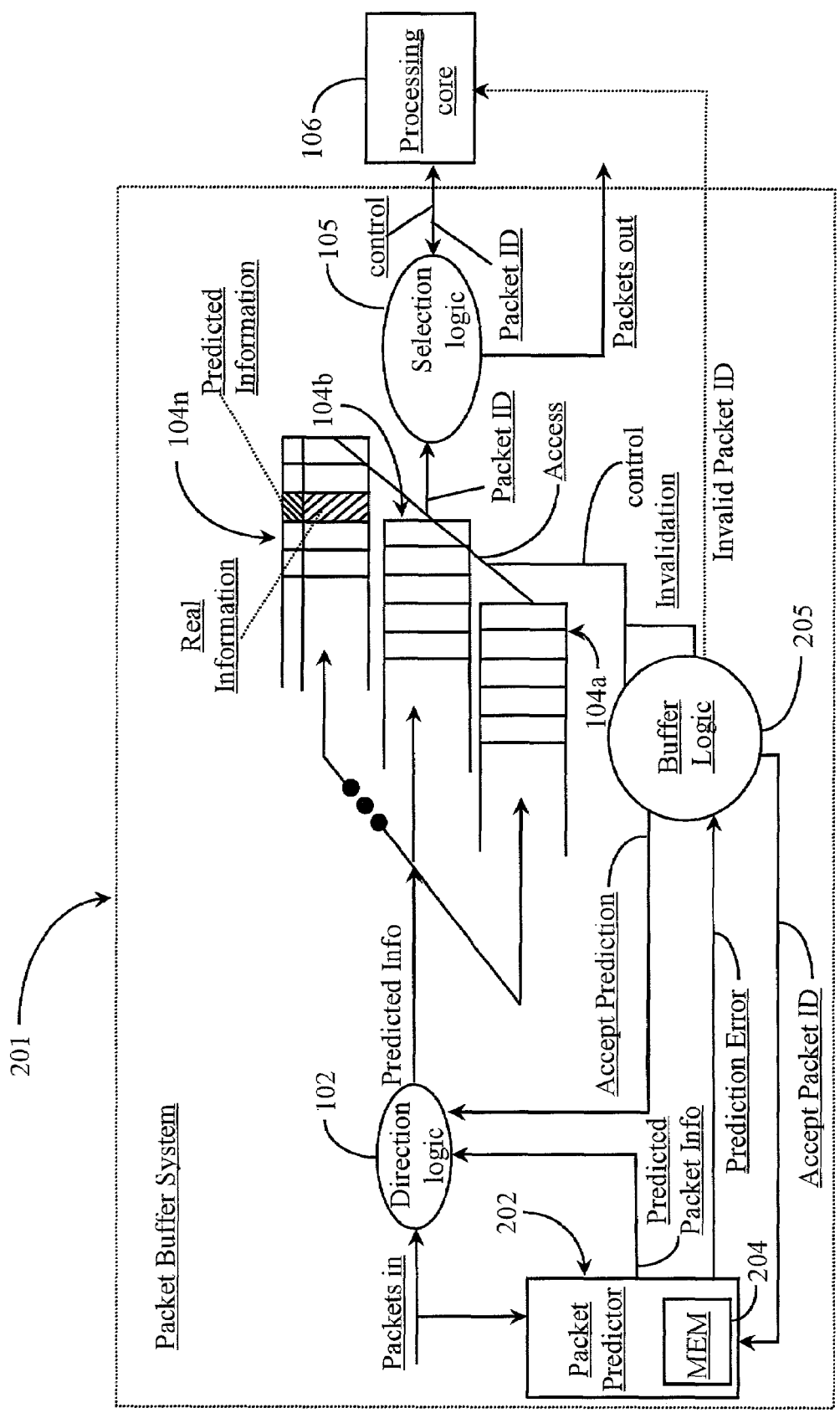
FIG. 2 is a block-diagram illustrating components added to a network processor to enable packet prediction according to an embodiment of the present invention.

FIG. 2 is a block-diagram illustrating components of a novel network processing system according to an embodiment of the present invention. In this example, a packet buffering system 201 is provided with a capability of predicting characteristics of some data packets before they arrive to the processing system. System 201 comprises queues 104a-n as described with reference to FIG. 1 above. Direction logic 102 and selection logic 105 are also present in this example as is processing core 106, and these elements are analogous to the components with the same element numbers previously described.

A novel hardware mechanism labeled herein Packet Predictor 202 is provided within system 201 and enables prediction of data packet characteristics before some packets actually arrive through ingress of the processing system. Data packet predictor 202 is a front-end hardware implementation that generates speculative packet information for a virtual data packet (predicted data packet). A packet prediction may be triggered by any one of several events and conditions, such as detection of idle processor time. A good time, however, and a trigger used in a preferred embodiment is when a real data packet is received by the processing system.

Packet predictor 202 has, in this example, a dedicated memory (MEM) 204 provided therein and adapted to store historical data regarding real data packets previously processed within the system and historical data about successful instances of predicted data packets within the system, wherein the speculative processing results associated with a predicted packet, backed up by a real packet, were correct enough to send the real packet out of the system requiring little or no processing of the information associated with the real packet. MEM 204 can be a flash type MEM, ROM, RAM, or any other type of usable memory sufficient in size to hold at least a historical record covering a pre-defined number of data packets.

In a preferred embodiment, MEM 204 stores a revolving history record that is updated periodically, whether or not the processing was "real" or "virtual". For example, MEM 204 may store historical data covering the last 10 data packets received, and also the practical result of the last ten data packets predicted. In other embodiments the history record could cover many more, or fewer data packets, both real and virtual. In an alternative embodiment of the invention, MEM 204 may be implemented externally from predictor 202 or from buffer system 201, or even externally from the router without departing from the spirit and scope of the present invention. For example, MEM 204 may be an assigned portion of existing memory within the processing system such as queue memory or processing core memory. There are many possibilities.

A buffer logic 205 is provided within packet buffering system 201 and adapted to control queue-state reporting and management of queues 104a-n similarly to buffer logic 103 described above with reference to FIG. 1. In this example logic 205 is enhanced to manage queue set 104a-n according to additional predictive capabilities of the present invention. Logically speaking, buffer logic 205 has control connection to a shared access line of queue set 104a-n as well as a control and communication connection to packet predictor 202. Additionally, there are illustrated connections between buffer logic 205 and direction logic 102 and between buffer logic 205 and processing core 106. The significance of these connections is explained in more detail below.

In an embodiment of the present invention, a novel method is practiced in conjunction with the capabilities of packet predictor 202 wherein all or a defined portion of characteristics of a next data packet to arrive to the processing system are predicted based upon current historical record accessed from MEM 204.

Packets In to direction logic 102, or at least information relative to these packets, is also copied into predictor 202. When a packet arrives, predictor 202 generates a prediction of the nature of the next packet to arrive based on data in MEM 204. Information predicted can include several separable components of a next packet, all of which, or some of which may be predicted depending on desired configuration. For example, header information includes typically some or all of source information, destination information, packet flow information, data protocol information, packet size information, and media type information. Each of these components of information in the header of a data packet can be regarded as a separate predictable component. Moreover, some of these components share dependencies. For example a header of two separate packets having a same source and destination address arriving in a close time period are quite likely to be of the same packet flow. Packets of a same flow are further quite likely to be of a same size. Packets of a same flow are also likely to be of a same protocol such as UDP or TCP/IP and so on.

An important object of the invention is to make a total or at least a partial prediction for a new (at this point virtual) data packet, not yet received, based on consultation of the history record in MEM 204 at the time of receipt of a real data packet, or at the instance of some other triggering event or condition. Information of the real data packet received would comprise the next historical entry in MEM 204.

In one embodiment, the historical data could be componential such that each predictable component category has its own constantly changing variable. Each component variable can be probability-based and weighed against a preset threshold. In this way, variables with a high likelihood of materializing in the next packet could be included in a prediction. In another embodiment, an algorithm is run that incorporates the sum weight of all of the component variables and produces a single predictive variable that is weighed against a preset threshold value for initiating or not initiating a total packet prediction. There are many devisable schemes.

Upon generating a prediction, packet predictor 202 sends predictive packet information over a control line to direction logic 102 as is illustrated logically with a directional arrow labeled Predicted Packet Info. Direction logic 102 then enqueues the information, in this example, in a sector of queue 104n (cross-hatched) that has been further divided to segregate predicted and real information of a same packet. The predicted information is enqueued in a section labeled Predicted Information. Later, when (and if) the real packet arrives, it will be enqueued into the same sector of queue 104n in a sub-section (reverse cross-hatched) labeled Real Information.

As the predicted information is enqueued, a Packet ID is generated by direction logic 102 identifying the packet number and position in queue. It is noted herein that the packet identification is assigned only to the predicted packet information, as a real packet has not yet arrived. In one example, buffer logic 205 is enhanced with a responsibility of validating a prediction based on access of MEM 204 of predictor 202 after an arbitrary prediction is made. In this embodiment, logic provided within buffer logic 205 runs an algorithm comparing the predicted information (the only information in queue at this point) with the historical variable and a preset threshold variable. The buffer logic then decides whether to accept or to invalidate the prediction.

If the prediction is accepted, then notification is made to direction logic 102, which passes the assigned Packet ID through selection logic 105 to processing core 106 with a command to initiate speculative processing. It is noted herein that a commitment to processing the predicted information is based on a comparison of the predicted information to the current value of the historical data and subject in a preferred embodiment to an acceptance or non-acceptance threshold. This algorithm can be run either by buffer logic 205, or by packet predictor 202 without departing from the spirit and scope of the present invention.

In the first case scenario, predictions are attempted for every next packet based on the last known history data before update. The buffer logic can, however, invalidate a prediction if its comparison with historical data detects that the prediction would likely be in error or does not meet a pre-set value threshold. In this case the packet predictor simply duplicates the last successful prediction instead of consulting history.

In the second case scenario, the packet predictor makes a prediction for every next packet wherein the predictions are only made as a result of consultation with the history in MEM 204, and the predictions are arbitrarily accepted and never invalidated before the actual packet that the prediction is based on arrives.

In either event, processor 106 is initiated when it is deemed that a prediction passes algorithm and is considered valid. At this time, processor 106 is processing information on a data packet that has yet to arrive. When the real packet does arrives, it or the information associated therewith is directed by direction logic 102 into a sub-divided sector containing the predicted information under processing. It is, of course, possible that the processing is completed before the packet arrives. It is also possible that the processing has just begun or is somewhere in process when the real packet arrives.

The real data packet information or notification thereof is fed into predictor 202 when it arrives. This event may (or may not) generate a new prediction. In this example, packet predictor 202 compares the real packet information with the predicted information to gauge any error in the original prediction. It is noted herein that prediction error can be totalized or compartmentalized. For example, it may be that a prediction of several characteristics can be in error regarding only one of those characteristics. In another embodiment, any error in prediction is sufficient to invalidate any processing having occurred in regards to the predicted information. Preferably, an error detection can be utilized to disregard certain aspects of processing, but retain other aspects that were correct.

In the case that the predicted information is totally or sufficiently wrong such as to invalidate any processing currently completed or underway on the predicted data, a prediction error notification is sent to buffer logic 205, which then issues an invalidation notification on the packet ID number associated with the predicted information. The predicted information is then discarded from queue and a notification containing the invalid packet ID is sent to processor 106 from buffer logic 205 (dotted line) ordering interruption and termination of any processing still underway on the predicted information. In this case, the real information is processed normally under a new packet ID number or under the same packet ID number re-issued to the real packet information.

In an example where a prediction is determined to be wrong wherein processing has to be re-initiated and completed for the real packet, it is noted that a proportional increase in processing latency results. Preferably, prediction error is compartmentalized per component such that only processing actually performed or being performed in error is invalidated. Using the same packet ID then, only the portion of the predicted information in error is discarded from queue and the processing results of the components that materialize in the real packet are used. Newly initiated processing on the components of the real packet that were wrongly predicted is initiated using the same packet ID and an increase in latency may be avoided. It is noted herein that prediction error data can also be included in history record without departing from the spirit and scope of the present invention.

In the case of successful prediction, the predictive processing results are used to send the real packet out of queue when it arrives, rendering latent processing of the real packet information unnecessary. As soon as a real packet is sent out to egress, the history record is updated with the associated information. It is noted herein that it is possible that a real packet arrives before any processing is actually initiated on it's predicted information. In this case, the packet can be processed un-speculatively, or in the event of a 100% correct prediction, registers already being loaded with predicted data for processing may continue un-abated and the speculative processing results known to be correct when performed can still be used to send out the real packet.

Figure 3:
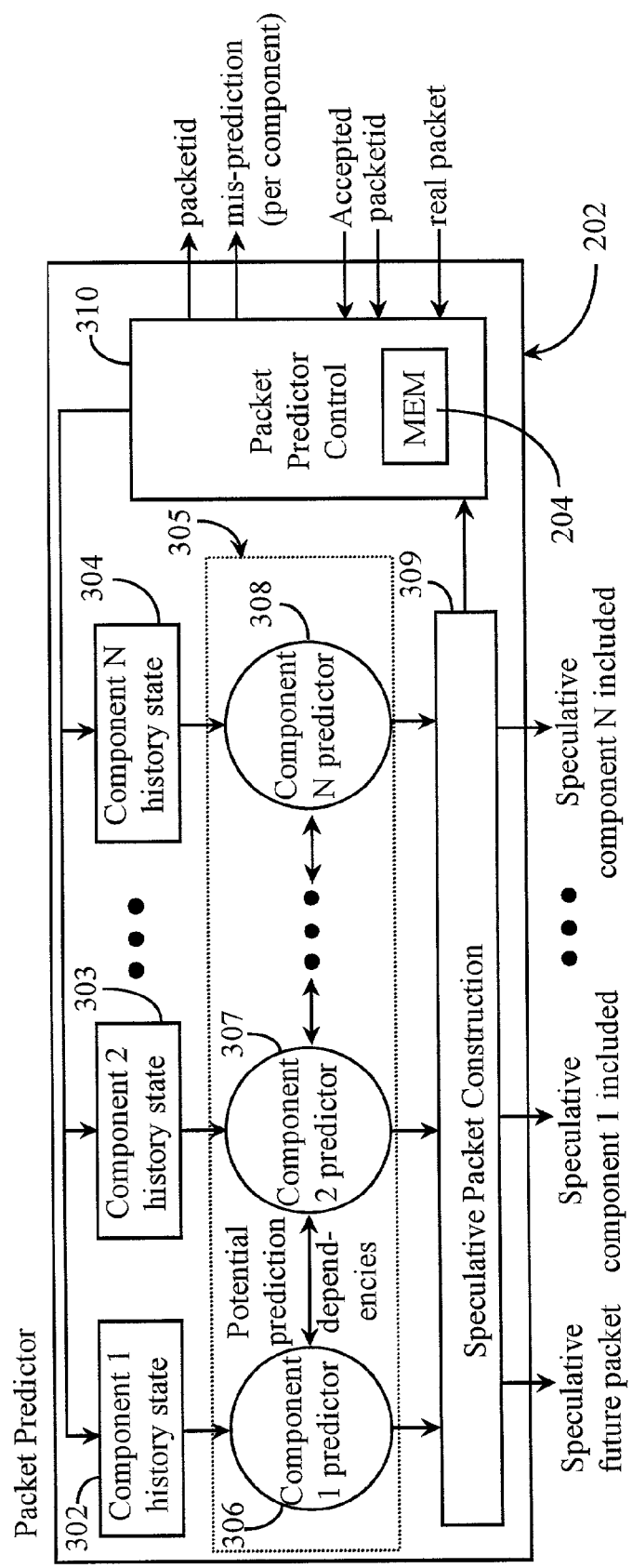
FIG. 3 is a block-diagram illustrating a data packet prediction mechanism of FIG. 2.

FIG. 3 is a block-diagram illustrating components of data packet prediction mechanism 202 of FIG. 2 in an embodiment of the invention. Packet predictor 202 has a packet predictor control mechanism 310 provided therein that is adapted to manage and control all of the functions of the prediction hardware. MEM 204 containing the historical record is illustrated within control block 310.

When a prediction is generated, in this example, MEM 204 is accessed for history states (can be equated to values) for a plurality of components 1-N. As noted, there are no practical limits to a number of separate predictable components of a data packet. In this compartmentalized example, each separate component is equated to a predictor component (algorithm), a plurality of which are illustrated in FIG. 3 as component predictors 1-N within a processing block 305. It is noted herein that in this example, each configured component is computed according to a history of that specific component in terms of likelihood of that specific component materializing correctly in a real packet being predicted.

Speculative Packet Construction 309 is provided within predictor 202 and adapted to construct the speculative packet or packet information according to the results received for each separable component. In one embodiment of the invention, certain components and their predictor blocks may be disabled while other ones of these are enabled. Freedom of configuration is assumed in this example. Block 305 accesses updated history on each selected component and performs a prediction based on that history, the predicted value incorporated in the packet construction.

Controller 310 sends out the completed predicted packet information, and in some embodiments, a valid packet ID. Alternatively, the buffering logic or direction logic may generate the packet ID in which case the ID is sent to predictor 202. If after receiving a real packet or information thereof, packet predictor 202 determines error in prediction, then a prediction error is sent out of controller 310. The prediction error notification can be specific to predicted component, and this is the case in a preferred embodiment of the invention. It is noted herein that, in some embodiments, each time a real packet is received, a new prediction process is initiated for a virtual packet. In other embodiments prediction may be triggered by other events and/or conditions.

In one embodiment of the present invention, predictor 202 may be configured to initiate a prediction only during periods of low workload or idle processor time. In this case the conditions for initiating a prediction are: when a packet arrives, if workload is below a specified threshold value, commit resources to packet prediction; else, don't commit resources.

It will be apparent to one with skill in the art of packet processing that predicting packet characteristics is useful for reducing overall processor latency in that data packet processing can be initiated before data packets actually arrive. For example, in an event where no or few packets are in the system, packet processing on predictive data may be initiated during such low or idle processor periods. If the prediction proves successful, latency is reduced. Other factors that contribute to successful prediction include common organization of same-sourced and destined packets into a packet flow. Also prevalent, in some cases in a network router, are patterned flow alternations wherein a packet from a particular packet flow will be received and then a next packet from a next flow and so on wherein the flow characteristics related to received packets can be predicted to a reasonable certainty.

By initiating speculative processing on a next packet based on predicted attributes, slow and idle periods inherent to data packet processors are filled with data processing. A reasonably accurate prediction rate will significantly reduce processor latency thereby enhancing performance and speed.

Figure 4:
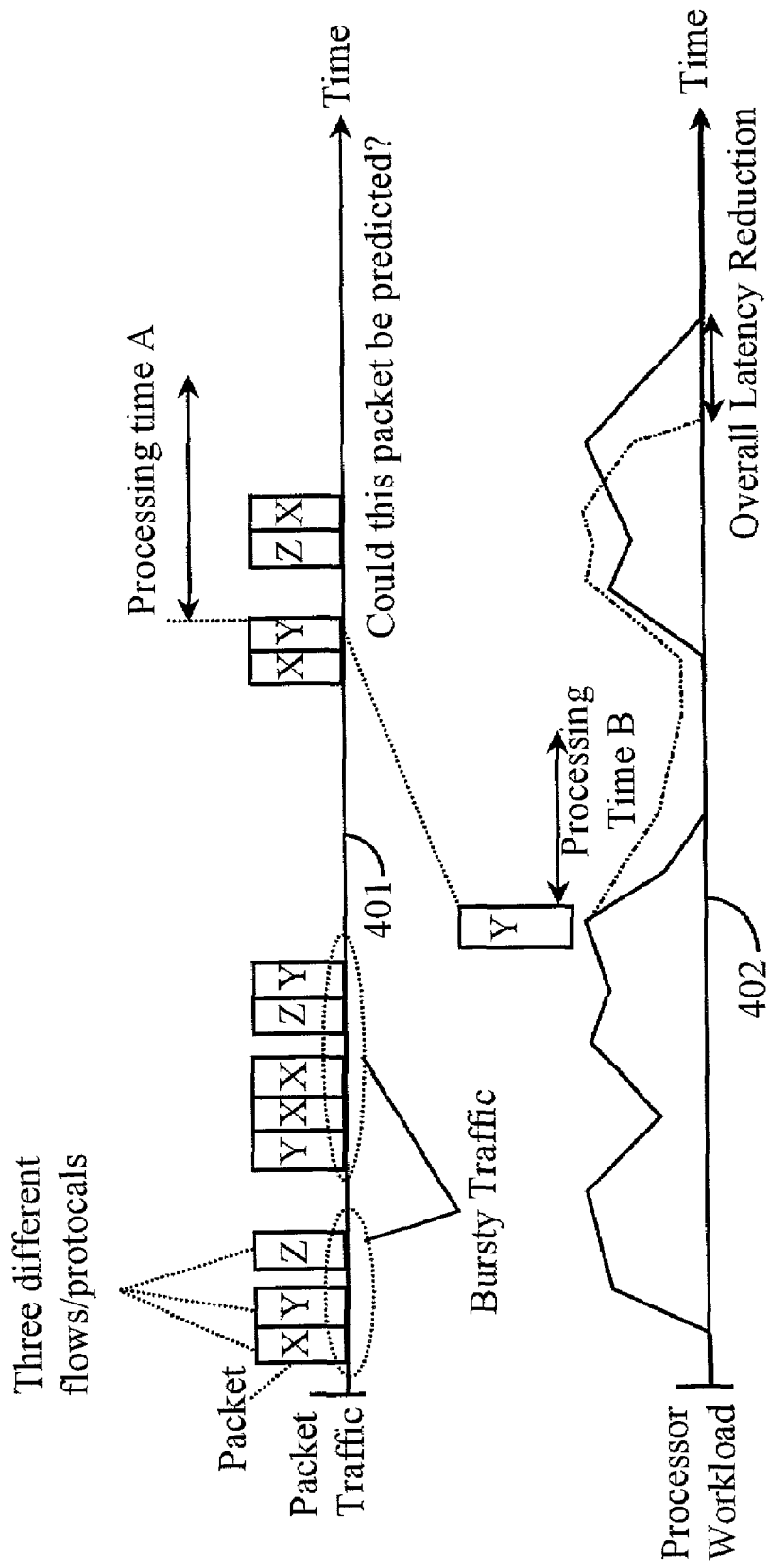
FIG. 4 is a block-diagram illustrating reduced processor latency by successful packet prediction according to an embodiment of the present invention.

FIG. 4 is a block-diagram illustrating reduced processor latency through successful packet prediction according to an embodiment of the present invention. In this example, there are 2 simple graphics illustrated. The first graphic is a line 401 representing a progression of time and illustrates the nature of data packet traffic entering a router over time. Data packets are represented in this example as X, Y, and Z representing three different packet flows. Packets X, Y, and Z are presented in bunches or groups intended to illustrate traffic entering a router or processor in data bursts typical of the Internet network, for example.

The second graphic illustrated is represented by line 402, which is a time line analogous to line 401. A processor workload is represented as a solid line exhibiting certain peaks, valleys, and idle periods (portions merging with time line 402). In association of the second graphic to the first one, it can bee seen that the peak periods of the processor workload over time correspond to the instances of data packets existing for processing. At valleys and idle sections of the processor workload line of the second graphic it can be seen, relating to the first graphic, that there are fewer or no data packets for processing.

In the first graphic, a processing time A is illustrated as beginning at a point along line 401 corresponding with an actual data packet Y received for processing. In other words, the processor would begin processing the first data packet Y at that point in time. If data packet Y illustrated at processing time A could have been successfully predicted before it had arrived, speculative processing could have been initiated earlier. In the second graphic a processing time B is illustrated as beginning on line 402 at the end of the most recent peak processing period. The speculative processing of packet Y in this case uses otherwise idle processor time and results in a subsequent processing peak that occurs before what would have normally occurred. Therefore, processor latency is plainly reduced by successful prediction of one of the represented packets.

Successful prediction of subsequent packets further reduces latency because at least one prediction is made every time a real packet is received. This fact tends to create some processing in otherwise idle and slow processor periods. In the last 10 of twelve packets represented in FIG. 4, it is noted that a packet from flow Z occurs every 4 packets. A next prediction might therefore be made that a next data packet to arrive will more than likely be a packet from either flow X or Y since the next packet will be the third packet from the last packet of Z. In this case, a prediction component represents what is most likely not to occur, which may narrow to a more successful prediction of a correct flow. Of course predicting a correct flow implies successful prediction of source and destination in the header information and so on. There are many possible prediction schemes, some of which depend on existing network conditions and rules used by an enabled processor.

Figure 5:
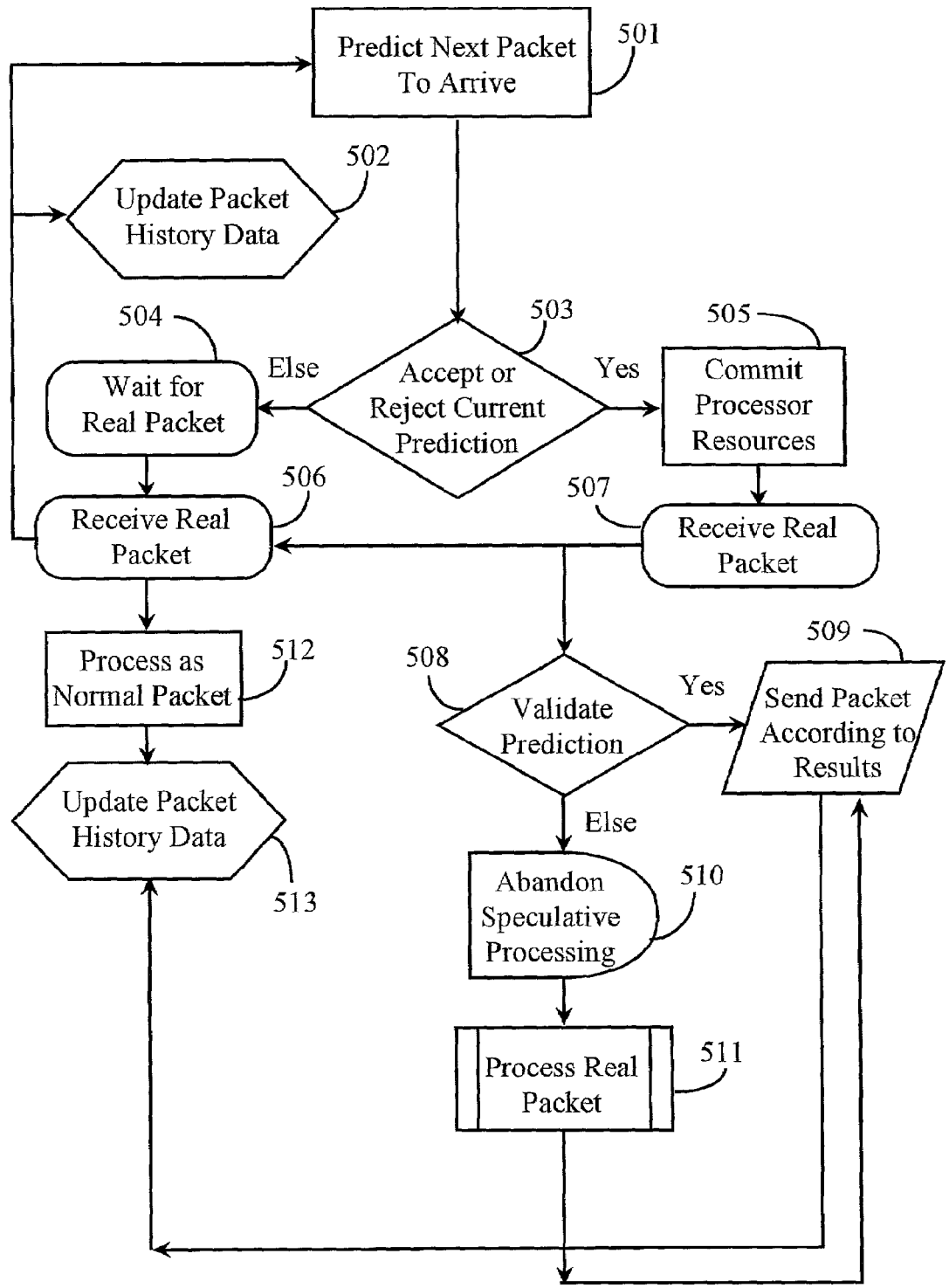
FIG. 5 is a process flow diagram illustrating system steps for practicing the invention.

FIG. 5 is a process flow diagram illustrating system steps for practicing packet prediction according to one embodiment of the present invention. At step 501, after a packet is received, a prediction is made regarding a next packet that will arrive in a processing system. Step 501 is performed, in a preferred embodiment, at each instance of receiving a real data packet into the system. At step 502, packet history data is updated with the correct information from the latest received packet as well as any relevant prediction data that may aid in forming a useful history record. The history record can be coded a metadata format or other machine-readable protocols.

At step 503, in this exemplary process, the prediction of step 501 is accepted or rejected after consulting updated history records. Step 503 is optional as the prediction at step 501 may be arbitrarily accepted as valid until an actual packet arrives. In step 503, if the prediction of step 501 is validated, processor resources are committed for speculative processing in step 505. If the prediction of step 501 is invalidated, then at step 504 the system waits for the real packet to arrive. A reason for invalidation may be that the last history update has caused the last prediction to be more unlikely and fall in terms of value below a pre-set threshold.

At steps 507 and 506 in both scenarios stemming from step 503, the real packet subject to the prediction of step 501 arrives within the system. In embodiments wherein the trigger event for predicting a virtual packet is the arrival of a real packet, immediately, a next prediction is made for a next data packet resolving back to step 501. In the case that the original prediction of step 501 was validated in step 503, at step 508 the prediction is validated against the real packet data received at step 507. As previously described, step 503 is optional and its function can be replaced by step 508. Step 508 is more valid because the comparison is against real data.

If at step 508 the prediction stands as valid against the real packet data, then at step 509 the real packet predicted is sent out according to the results of speculative processing. Else, if the prediction of step 501 wholly or partially failed against the real packet data, then at step 510, speculative processing at least for the wrong components is abandoned. Any wrong results already written in error are similarly abandoned at step 510. However, any results that were predicted correct are kept and utilized. In this way the speculative processing is not a total waste, unless all predicted components were in error.

At step 511, the real packet is processed in the event of a total invalidation of the prediction of step 501. Otherwise, only the portion of the data of the real packet that was wrongly predicted will be processed, again saving resources where possible. At step 513, the real results and any speculative confirmations resulting from steps 511 and 509 are updated into the packet history.

In a history of limited entries, say for example 100 entries, then the last entry would drop out of the history at each update. It is important to note herein the granularity and entry number (per packet) may vary according to design and prediction scheme employed. One with skill in the art will appreciate that a larger history will provide more accuracy for prediction variables, but using a larger history record could take more time for computation. Therefore, a reasonable number of packet entries may be relatively small in comparison to total data traffic traveling through a router or processing system.

However, many components that may be predicted will have computations that may begin as soon is an update is registered. All of the separate component values may be simultaneously calculated.

At step 513, the history record is updated as a result of sending a packet out in steps 509 and immediately after step 511. Step 509 in this example is considered a same step for both scenarios stemming from step 508 with the only difference being the speculative or un-speculative nature of the processing results.

It will be apparent to one with skill in the art that steps in this exemplary process may be re-ordered, eliminated, or supplemented with sub-routines without departing from the spirit and scope of the present invention. For example, if step 503 as an option is eliminated, then speculative processing will always result from all predictions until real packet data arrives. This embodiment may be desired if the prediction is compartmentalized into several separately predictable and processable components.

At step 501, if making a prediction is based on a consultation of history record (step not shown), then it is possible periodically that a prediction will not be made, and step 501 will resolve to step 504 for the instant packet in question.

It will be apparent to one with skill in the art that even a small success rate of packet prediction can increase processor efficiency. The system, apparatus, and method of the present invention can be utilized in any machine capable of forwarding data packets through a network from source to destination. Therefore the claimed subject matter below should be afforded the broadest of interpretation. The spirit and scope of the present invention is limited only by the claims that follow.

What is claimed is:

1. A packet buffering system for predictively processing data packets in a data packet network, the data packets associated with a plurality of data flows, the data flows from of a plurality of protocols, the system comprising:

at least one input port for receiving data packets from a plurality of sources, wherein the received data packets arrive from the plurality of data flows, interspersed;

at least one output port for sending out data packets to a plurality of destinations;

a packet predictor, coupled to said at least one input port, for predicting information about a future packet in any one of the plurality of data flows based on history of previously received packets from the plurality of data flows, said history stored in a memory coupled to said packet predictor;

a plurality of queues for storing packets received from said plurality of sources, and for storing said predicted information about said future packet;

direction logic, coupled to said packet predictor, for generating a Packet ID for said future packet, wherein said Packet ID is stored in one of said plurality of queues;

buffer logic, coupled to said packet predictor, for accessing said memory and for validating said predicted information about said future packet based on said access to said memory; and a processing core, coupled to said plurality of queues, wherein if said buffer logic validates said predicted information, notification is made to said direction logic which passes said Packet ID for said future packet to said processing core to initiate speculative processing.

2. The system of claim 1 wherein the data packet network is the Internet network.

3. The system of claim 1 wherein the packet predictor utilizes a history record periodically updated by the system, to generate predicted data.

4. The system of claim 3 wherein the history record comprises characteristics of recently received data packets.

5. The system of claim 4 wherein the history record further comprises results of past predictions.

6. The system of claim 1 wherein said packet predictor predicts specific characteristics, comprising one or more of packet type, packet flow identification, sender information, destination information, and packet size for said future packet.

7. The system of claim 1 comprising a packet router.

8. The system of claim 1 comprising a data server.

9. A packet predictor system for predicting information about future packets to be received within a data packet processor, the future packets associated with a plurality of data flows, the data flows associated with a plurality of protocols, the predicted information being processed by a processing core prior to the future packets being received, the processing reducing latency in routing the future packets to their destinations, the system comprising:

an input for receiving information about non-predicted packets received for processing;

a packet predictor, coupled to said input, for predicting information about the future packets, based upon the information received about the non-predicted packets;

a plurality of queues, coupled to said input and said packet predictor, for storing the predicted information;

direction logic, coupled to said packet predictor, for generating a Packet ID for said future packet, wherein said Packet ID is stored in one of said plurality of queues; and a processing core, coupled to said plurality of queues, for processing the predicted information before the future packets are received by said input;

wherein by processing the predicted information before the future packets are received, latency for delivering the future packets to an output is reduced.

10. The packet predictor system of claim 9 wherein the data packet processor comprises a data router operating on the Internet network.

11. The packet predictor system of claim 9 comprising a history record consulted each time a prediction is made.

12. The packet predictor system of claim 11 wherein the history record comprises history of real packets received and processed.

13. The packet predictor system of claim 11 wherein the history record comprises history of prediction and results of the predictions.

14. The packet predictor system of claim 9 wherein the history record is stored in a memory accessible to the system.

15. The packet predictor system of claim 9 wherein said packet predictor predicts specific characteristics, comprising one or more of packet type, packet flow identification, sender information, destination information, and packet size.

16. The packet predictor system of claim 9 wherein the data packet processor comprises a data server.

17. A method for reducing latency in packet processing within a packet processor, comprising the steps of:

receiving packets associated with a plurality of data flows, the data flows from a plurality of protocols, developing and storing a history of packet information from the received packets;

predicting future information about future packets from the stored history;

validating the future information about the future packets responsive to the stored history, and if validated;

generating a Packet ID for said future packet and storing said Packet ID in one of a plurality of queues;

processing the future information about the future packets before the future packets are received;

wherein by processing the future information about the future packets before the future packets are received, latency in delivering the future packets to their destinations is reduced; and wherein the information comprises one or more of packet type, packet flow identification, source information, destination information, and packet size.

18. The method of claim 17 wherein the packet processor is coupled with a data packet network.

19. The method of claim 18 wherein the data packet network is the Internet network.

20. The method of claim 17 comprising the step for maintaining a history of either or both of packets actually received and results of prior predictions.

21. The method of claim 17 wherein said step of processing is abandoned if it is determined not to agree with the real data once it arrives.

22. The method of claim 17 wherein in, if some of the results from processing the predicted future information are wrong they are abandoned, and results which are corrected are retained, to reduce processing for an arriving packet based on the prediction.

* * * * *